2,974,149
Patented Mar. 7, 1961

2,974,149

CONDENSATION OF ETHERS WITH POLY-CHLOROOLEFINS

Louis Schmerling, Riverside, Ill., assignor, by mesne assignments, to Universal Oil Products Company, Des Plaines, Ill., a corporation of Delaware No Drawing. Filed Nov. 21, 1957, Ser. No. 697,790

4 Claims. (Cl. 260—340.6)

This application is a continuation-in-part of my copending application Serial No. 369,939, filed July 23, 1953, now abandoned.

This invention relates to the condensation of an ether with a polychloroolefin, and more particularly to the condensation of a cyclic ether with a polychloroolefin in the presence of a catalyst which generates free radicals at operating conditions.

An object of this invention is to condense cyclic ether with a polychloroolefin.

Another object of this invention is to condense a polychloroolefin containing at least 1 chlorine atom on each of the duobly bonded carbon atoms with a cyclic ether.

One embodiment of this invention resides in the preparation of a chloro substituted aryl derivative of a dioxane which comprises condensing a polychloroolefin containing at least 1 chlorine atom on each of the doubly bonded carbon atoms with a dioxane in the presence of a peroxy compound catalyst at a temperature at least as high as the decomposition temperature of said catalyst and at a pressure such that a substantial portion of the reactants is in liquid phase, and recovering the resultant chloro substituted alkenyl derivative of a dioxane.

A further embodiment of the invention is found in the reaction between a polychloroolefin containing at least 1 chlorine atom on each of the doubly bonded carbon atoms with 1,4-dioxane in the presence of di-t-butyl peroxide at a temperature at least as high as the decomposition temperature of said catalyst and at a pressure such that a substantial portion of the reactants is in liquid phase, and recovering the resultant chloro substituted alkenyl derivative of a dioxane.

A specific embodiment of the invention is found in a process for the preparation of a chloro substituted alkenyl derivative of a dioxane which comprises condensing trichloroethylene with 1,4-dioxane in the presence of a catalyst comprising di-t-butyl peroxide at a temperature at least as high as the decomposition temperature of said catalyst and at a pressure such that a substantial portion of the reactants is in the liquid phase, and recovering the resultant 2-(2,2-dichlorovinyl)-1,4-dioxane.

Yet another embodiment of the invention is a halo substituted alkenyl derivative of 1,4-dioxane.

Other objects and embodiments referring to alternative polychloroolefins, alternative ethers and to alternative free radical generating catalysts will be found in the following further detailed description of the invention.

It has now been discovered that halo substituted alkenyl derivatives of cyclic ethers, and in particular of dioxanes, may be prepared by condensing polyhaloolefins containing at least one chlorine atom on each of the doubly bonded carbon atoms and a cyclic ether. The condensation products resulting from this reaction will find a wide variety of uses in the chemical field, for example, as intermediates in the preparation of polymers, resins, pharmaceuticals and in the synthesis of diverse organic chemicals. Some of the compounds may be useful per se as insecticides or they may be reacted with other polyhaloolefins in a Diels-Adler type reaction to form halo substituted compounds having potent insecticidal properties.

For example, the condensation product of the reaction of trichloroethylene with 1,4-dioxane, namely, 2-(2,2-dichlorovinyl)-1,4-dioxane may be reacted with hexachlorocyclopentadiene to form 2-(1,3,3,4,5,6,7,7-octachloro-5-norbornen-2-yl)-1,4-dioxane which is useful as an insecticide, especially against houseflies. Other condensation products of cyclic ethers and the polyhaloolefins of the aforementioned type may be sulfated or, if the ether contains an aromatic nucleus, the aromatic nucleus may be sulfonated to form materials which are themselves surface active agents such as wetting agents or detergents.

The polyhaloolefins which may be reacted with an ether of the type hereinafter set forth comprise polyhaloolefins containing a pair of doubly bonded carbon atoms in which at least one chlorine atom is attached to each of said doubly bonded carbon atoms, said compounds including both polyhaloalkenes and polyhalocyclenes. As readily observed, this type of configuration still leaves one valence of each of the doubly bonded carbon atoms free and these two free valences may be taken up by constituents such as hydrogen atoms, halogen atoms including fluorine, bromine, and chlorine, an alkyl group such as methyl, ethyl, propyl, etc., or haloalkyl group such as a chloro ethyl group or a trifluoro methyl group, etc. In addition, these two valences may also form part of a carbocyclic ring system containing one or more double bonds. For the purposes of this specification and claims, the term "cyclene" is used as a generic term for non-aromatic carbocyclic rings containing one or more double bonds. The chloroolefins which comprise the preferred species of the invention may be either an open chain type or the carbocyclic type and may contain one or more double bonds having a chlorine atom attached to each of the doubly bonded carbon atoms and at least one of the doubly bonds present. This type of configuration in which the polyhaloolefin contains at least one chlorine atom on each of the doubly bonded carbon atoms is a necessary prerequisite in order that the condensation product of the reaction between the polyhaloolefin and the ether is a halo substituted alkenyl derivative of the ether. If at least one chlorine atom is not present on each of the doubly bonded carbon atoms the resultant condensation product will be an alkyl derivative of the ether rather than the desired alkenyl derivative.

For example, the reaction between 1,1-dichloro-2,2-difluoroethylene and 1,4-dioxane will result in the formation of 2-(1,1-difluoro-2,2-dichloroethyl)-1,4-dioxane according to the equation:

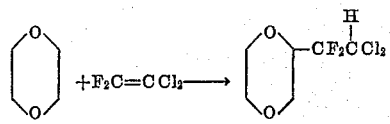

Likewise, if a polyhaloolefin containing chlorine atoms on only one of the doubly bonded carbon atoms such as 1,1-dichloroethylene is reacted with a cyclic ether such as 1,4-dioxane, no condensation product involving the dioxane will be obtained. However, if 1,2-dichloro-1,2-difluoroethylene is reacted with 1,4-dioxane the resultant condensation product will be 2-(1,2-difluoro-2-chlorovinyl)-1,4-dioxane according to the equation:

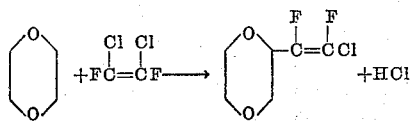

Therefore, it is readily apparent that the present invention is effective when using only a specific type of unsaturated compound, namely, a polyhaloolefin containing at least 1 chlorine atom on each of the doubly bonded carbon atoms.

Examples of suitable polyhaloolefins of the type hereinbefore set forth include cis and trans-dichloroethylene, trichloroethylene, tetrachloroethylene, 1-fluoro-1,2-dichloroethylene, 1,2-difluoro-1,2-dichloroethylene, 1-bromo - 1,2-dichloroethylene, 1,2-dibromo-1,2-dichloroethylene, 1,2-dichloro-1-propene, 1,1,2-trichloro-1-propene, 1,2,3-trichloro-1-propene, 1,1,2,3-tetrachloro-1-propene, 1-fluoro - 1,2-dichloro-1-propene, 1-bromo-1,2-dichloro-1-propene, 1,2-dichloro-1-butene, 1,1,2-trichloro-1-butene, 1,2,3-trichloro-1-butene, 2,3-dichloro-2-butene, the isomeric pentenes, hexenes, heptenes, octenes, nonenes, etc., containing at least one chlorine atom on each of the doubly bonded carbon atoms, etc.

Polychloro-olefins such as 1,2-dichloro-3-fluoro-1-propene, 1,2-dichloro-3,3-difluoro-1-propene, 1,2-dichloro-3,3,3-trifluoro-1-propene, 1,2-dichloro-3-bromo-1-propene, 1,2 - dichloro-3,3-dibromo-1-propene, 1,2-dichloro-3,3,3-tribromo-1-propene, etc., that contain one or more fluorine or bromine atoms attached to one or more saturated carbon atoms, for example, carbon atoms bonded by univalence bonds to four atoms may be used in this process since the fluorine or bromine atoms in such compounds do not noticeably affect the reactivity of the chlorine atoms. Also, one or more fluorine or bromine atoms may be attached to the doubly bonded carbon atoms provided that the above mentioned requirement for chlorine atoms attached to doubly bonded carbon atoms is met. The chlorocycloolefins as hereinbefore defined may contain 4, 5, 6 and 7 carbon atom rings and include such compounds as 1,2-dichloro-1-cyclobutene, 1,2-dichloro-1-cyclopentene, 1,2-dichloro-1-cyclohexene, 1,2 - dichloro - 1-cycloheptene, 1,2,3-trichloro-1-cyclobutene, 1,2,3-trichloro-1-cyclopentene, 1,2,3-trichloro-1-cyclohexene, 1,2,3,4-tetrachloro-1-cyclobutene, 1,2,3,4-tetrachloro-1-cyclohexene, etc.

These carbocyclic olefins and carbocyclic diolefins may contain as substituents for all nuclear carbon atoms hydrogen atoms, alkyl groups, halogen atoms, haloalkyl groups, etc. Specific examples of suitable compounds include 3-methyl-1,2-dichloro-1-cyclopentene, 4-chloromethyl-1,2-dichlorocyclopentene, hexachlorocyclopentadiene, 3 - fluoro - 1,2-dichloro-1-cyclohexene, 1,2,3,4-tetrachloro-1,3-cyclohexadiene and 1,2,4,5-tetrachloro-1,4-cyclohexadiene. Other examples of these compounds will be readily apparent to one skilled in the art. Further suitable cyclic olefins include chlorinated bicyclo-olefins and chlorinated terpenes in which each of the doubly bonded carbon atoms has at least one chlorine atom attached thereto. Suitable compounds include 2,3-dichlorobicyclo(2.2.1)-2-heptene, chlorinated camphenes, chlorinated pinenes, chlorinated santenes, chlorinated fenchenes, etc. Chlorinated monocyclic terpene in which each of the doubly bonded carbon atoms has at least one chlorine atom attached thereto may also be used.

The preferred ethers which are utilizable as starting materials in the process of the present invention comprise cyclic ethers such as 1,3-dioxane, 1,4-dioxane, tetrahydrofuran, tetrahydropyran, etc. It is essential that the ethers which are used as reactants in this process have a replaceable hydrogen atom on a carbon atom adjacent the oxygen atom. Other ethers which may be condensed with the polyhaloolefin to prepare halo substituted alkenyl derivatives of the ether include aliphatic ethers such as dimethyl ether, diethyl ether, dipropyl ether, dibutyl ether, etc., methyl ethyl ether, methyl propyl ether, methyl butyl ether, ethyl propyl ether, ethyl butyl ether, ethyl amyl ether, etc. Unsaturated ethers such as vinyl ether, allyl ether, vinyl ethyl ether, vinyl butyl ether, allyl ethyl ether, allyl butyl ether, etc., may be used but not necessariy with equivalent results. Aromatic ethers such as dibenzyl ether, $\beta,\beta'$-diphenyl diethyl ether, $\gamma,\gamma'$-diphenyl dipropyl ether, etc., in which at least 1 of the carbon atoms adjacent the oxygen atom is aliphatic and has at least one hydrogen atom attached to it may also be used in this process. Other suitable ethers which may be used include methyl phenyl ether, ethyl phenyl ether, propyl phenyl ether, methyl benzyl ether, ethyl benzyl ether, propyl benzyl ether, etc., may also be used. While it is noted that the aliphatic and aromatic ethers which are utilizable in the present process are those in which at least one of the carbon atoms adjacent the oxygen atoms holds at least one hydrogen atom, these ethers are not necessarily equivalent to the cyclic ethers which constitute the preferred reactants of the present process.

The catalysts which may be used in the present process are those which are capable of forming free radicals under the reaction conditions. These include peroxy compounds, containing the bivalent radical —O—O—, and which are capable of inducing the condensation of ethers with polychloro-olefins. The organic peroxy compounds constitute a preferred class of catalysts for use in this invention and include peracetic acid, persuccinic acid, dimethyl peroxide, diethyl peroxide, di-tert-butyl peroxide, dipropyl peroxide, acetyl benzyl peroxide, acetyl peroxide, propionyl peroxide, butyryl peroxide, lauroyl peroxide, benzoyl peroxide, tetralin peroxide, urea peroxide, tert-butyl perbenzoate, tert-butyl hydroperoxide, methylcyclohexyl hydroperoxide, etc. Other catalysts which may be used are the persulfates, perborates and percarbonates of ammonium and the alkali metals, etc. as well as mixtures of the peroxy compounds. Only catalytic amounts, less than the stoichiometric amount, need be used in this process.

The reaction temperature employed in the process of this invention should be at least as high as the initial decomposition temperature of the free radical generating catalyst, such as a peroxide compound, in order to liberate and form free radicals which promote the reaction. However, the operating temperature generally does not exceed the decomposition temperature of the catalyst by more than about 150° C. In the continuous method of carrying out this process, the catalysts preferably are added continuously to the reaction zone, but, if desired, catalyst may be added intermittently, particularly when a packing material is used which retains the catalyst in the reaction zone. When a free radical generating catalyst such as tert-butyl perbenzoate is used, having a decomposition temperature of approximately 115° C., the operating temperature of the process is from about 115° C. to about 265° C. When a di-tert-butyl peroxide having a decomposition temperature of about 130° C. is used the process is run at a temperature of from about 130° C. to about 280° C. Higher reaction temperatures may be employed, but little advantage is gained if the temperature is more than the hereinbefore mentioned 150° C. higher than the decomposition temperature of the catalyst. The general effect of increasing the operating temperature is to accelerate the rate of the condensation reaction between the poly-halo-olefins and the ether. However, the increased rate of reaction is accompanied by certain amounts of decomposition. The preferred operating pressure of the process is that needed to keep a substantial portion of the reactants in a liquid phase and will generally range from atmospheric pressure to about 100 atmospheres or more.

Concentration of the catalyst employed in this process may also vary over a rather wide range but it is desirable to use low concentrations of catalysts such as from about 0.1% to about 10% of the total weight of a polyhaloolefin and the ether charged to this process. The reaction time of the process may be within the range of slightly less than one minute to several hours. However, contact times of at least 10 minutes are usually preferred.

The process of this invention may be carried out in any suitable manner and may be either a batch or continuous type of operation. When a batch type operation is used, a quantity of the ether and the desired free radical generating catalyst is placed in a reactor equipped with a mixing device. The polyhalo-olefin is thereafter added and the reactor is heated to the desired reaction temperature while mixing the contents thereof. After a suitable period of time has elapsed the reactor and the contents are cooled to room temperature and the condensation product is recovered by conventional means, for example, by fractional distillation.

Another method of operation of the present process, which constitutes the preferred method of operation, is of the continuous type. In this method of operation the desired ether, the polyhalo-olefins, and the catalyst are continuously charged to a reaction zone maintained at suitable operating conditions of temperature and pressures. The reaction zone may be an unpacked vessel or coil, or it may be an adsorbent packing material such as fire brick, alumina, dehydrated bauxite and the like. The aforesaid reactants may be charged to the reactor through separate lines, or if so desired, one of the reactants may be admixed with the catalyst before admittance to said reactor and the mixture charged thereto in a single stream. The condensation products are separated from the reactor effluent, and the unconverted materials may be recycled to the reaction zone to form a portion of the starting material.

A modification of the above mentioned process of adding the free radical generating catalyst to the reaction zone is found in the process of forming a catalyst in situ in the ether and then charging the resultant solution to the reaction zone together with the polyhalo-olefins. Formation of the peroxy compound catalyst in the ether may be accomplished by autooxidation, for example, by heating the compound while air is bubbling therethrough, preferably in presence of a trace of peroxide formed in a previous autooxidation. Alternately, the air may be passed through the compound in the presence of an oxidation catalyst such as manganese stearate. In the continuous method of operation of carrying out this process, the catalysts are preferably added continuously to the reaction zone, but if desired, they may be added intermittently.

During the course of the condensation reaction of the present process, hydrogen chloride is evolved. In cases where it is desired to avoid radical changes in pH during the course of the reaction, small amounts of material which have buffering reaction on the pH may be included in the condensation mixture. Since the condensation can be carried out satsifactorily in either an acid or an alkali medium, many types of buffering agents can be used. For example, an alkaline pH can be maintained by the use of such buffers as borax, disodium phosphate, sodium carbonate, ammonium carbonate, sodium acetate, etc. For a pH below 7, such materials as acetic acid, propionic acid, other organic acids, monosodium phosphate and the like may be used.

The halo substituted alkenyl derivatives of 1,4-dioxane which comprises new compositions of matter include 2-(2-chlorovinyl)-1,4-dioxane, 2-(2,2-dichlorovinyl)-1,4-dioxane, 2-(1,2-dichloropropenyl)-1,4-dioxane, 2-(2-chloropropenyl)-1,4-dioxane, 2-(2-chloro-2-fluorovinyl)-1,4-dioxane, 2-(2-chloro-3,3-difluoropropenyl)-1,4-dioxane, etc.

The following examples are given to illustrate the process of the present invention, which, however, are not intended to limit the generally broad scope of the present invention in strict accordance therewith.

Example I

One hundred grams of 1,4-dioxane, 41.5 grams of trichloroethylene and 8 grams of di-t-butyl peroxide were placed in a glass liner in an Ipatieff-type rotating autoclave and heated to a temperature of approximately 135° C. for a period of 4 hours. At the end of this time the reaction product was separated from the unreacted starting material by fractional distillation yielding 12 grams of the material boiling at 140° C. at 96 mm. The material was then distilled through an efficient column and the cut boiling at 140° C. was analyzed. Analysis of the product showed that it had the required composition:

Calculated for $C_6H_8Cl_2O_2$: C, 39.37; H, 4.40; Cl, 38.74. Found: C, 39.38; H, 4.51; Cl, 38.77.

This material, 2-(2,2-dichlorovinyl)-1,4-dioxane, was formed according to the following equations:

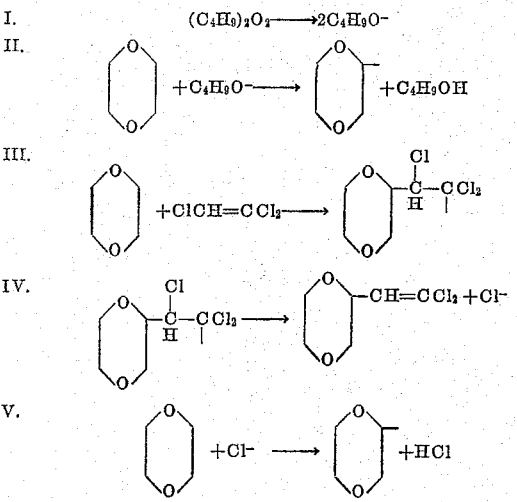

The 1,4-dioxane radical formed in step V reacts with the trichloroethylene as in step III and a new cycle is started thereby. The reaction set forth in steps I and II serve as only chain initiators.

Example II

One hundred grams of 1,4-dioxane, 40 g. of 1,2-dichloroethylene and 8 g. of t-butyl perbenzoate are placed in a glass liner of a rotating autoclave of the type hereinbefore set forth in Example I and heated to a temperature of approximately 110–120° C. for a period of about 4 hours. At the end of this time the autoclave and contents thereof are cooled to room temperature and the reaction product is separated from the unreacted starting materials by fractional distillation under reduced pressure, the desired product, comprising 2-(2-chlorovinyl)-1,4-dioxane being separated and recovered.

Example III

A mixture of 100 g. of 1,4-dioxane and 45 g. of 1,1,2-trichloro-1-propene along with 5 g. of a catalyst comprising benzyl peroxide is boiled under a reflux column for six hours. The desired product, comprising 2-(1,2-dichloropropenyl)-1,4-dioxane is separated and recovered by distillation.

Example IV

An insecticidal composition is prepared by condensing equimolar proportions of 2-(2,2-dichlorovinyl)-1,4-dioxane and hexachlorocyclopentadiene to form 2-(1,2,3,4,5,6,7,7-octachloro-5-norbornen-2-yl)-1,4-dioxane. One gram of this product is dissolved in 2 cc. of benzene and 100 cc. of water is then added using Triton X–100 as an emulsifying agent. The resultant solution is sprayed into a cage containing houseflies causing a 100% knockdown.

I claim as my invention:

1. A compound selected from the group consisting of 2-(2-chlorovinyl)-1,4-dioxane, 2-(2-dichlorovinyl)-1,4-dioxane, 2-(1,2-dichloropropenyl)-1,4-dioxane, 2-(2-chloropropenyl)-1,4-dioxane, 2-(2-chloro-2-fluorovinyl)-1,4-dioxane, and 2-(2-chloro-3,3-difluoropropenyl)-1,4-dioxane.
2. 2-(2-chlorovinyl)-1,4-dioxane.
3. 2-(2,2-dichlorovinyl)-1,4-dioxane.
4. 2-(1,2-dichloropropenyl)-1,4-dioxane.

References Cited in the file of this patent
UNITED STATES PATENTS
2,433,844  Hanford _____ Jan. 6, 1948